United States Patent [19]

Strohschneider

[11] 3,783,273

[45] Jan. 1, 1974

[54] METHOD AND APPARATUS FOR CONTROLLING A LIGHT SOURCE OF AN OPTICAL READER MECHANISM

[75] Inventor: Walter Strohschneider, Oberrieden, Switzerland

[73] Assignee: Zellweger AG, Uster, Switzerland

[22] Filed: July 3, 1972

[21] Appl. No.: 268,692

[30] Foreign Application Priority Data

July 8, 1971 Switzerland ....................... 10079/71

[52] U.S. Cl. ............................ 250/223, 250/219 D
[51] Int. Cl. ....................... G01n 21/30, G06m 7/00
[58] Field of Search ................. 250/233, 205, 219 D

[56] References Cited

UNITED STATES PATENTS

| | | | |
|---|---|---|---|
| 3,225,177 | 12/1965 | Stites et al. | 250/219 D |
| 3,532,859 | 10/1970 | Laplume | 250/219 D |

*Primary Examiner*—James W. Lawrence
*Assistant Examiner*—T. N. Grigsby
*Attorney*—Werner W. Kleeman

[57] ABSTRACT

A method of controlling a light source of an optical reader mechanism wherein a light source generating a scanning light beam is essentially only placed into its operating condition during the time-span required for carrying out a scanning operation, during the remaining time it is controlled so as to assume a preparatory condition with reduced or interrupted power supply.

The apparatus for carrying out the aforesaid method embodies a light source for generating the scanning light beam and a supply means associated with such light source. A control mechanism is provided for the supply means for regulating the respective operating and preparatory condition of the light source. The control mechanism has delivered thereto an input signal as a function of the throughpassage of an object through a reading zone of the reader mechanism.

10 Claims, 3 Drawing Figures

METHOD AND APPARATUS FOR CONTROLLING A LIGHT SOURCE OF AN OPTICAL READER MECHANISM

BACKGROUND OF THE INVENTION

The present invention relates to a new and improved method of, and apparatus for, controlling a light source of an optical reader or reader mechanism.

The prior art is familiar with optical reader mechanisms or readers employing the technique of delivering a scanning beam over a character to be read-out or recognized. Such mechanisms employ a light beam emanating from a high-intensity light source, for instance a halogen lamp, a xenon lamp or laser light source and the like in order to carry out optical scanning. A field of use of such optical readers resides, for instance, in the recognition of random articles or objects which, however, are furnished with a photoelectric readable character, as such articles are selected for instance by customers in self-service stores, supermarkets and the like, and these objects must be recognized at a processing-check-out or cashier station.

The aforementioned light sources only have a limited longevity and the use thereof is associated with undesired costs and expense. Hence, temporary disruption of such processing or cashier's station as a consequence of the need to replace the light source can lead to notable disturbances in the business operation. Owing to the high light intensity the possibility also exists that persons in the area can be disturbingly or dangerously blinded.

SUMMARY OF THE INVENTION

Hence, from what has been explained above it should be apparent that this particular field of technology is still in need of an improved method of, and apparatus for, controlling the light source of an optical reader which is not associated with the aforementioned drawbacks and limitations of the prior art proposals. Therefore, it is a primary objective of the present invention to overcome these drawbacks and to effectively and reliably fulfill the existing need in the art.

Another and more specific object of the present invention relates to an improved method of, and apparatus for, controlling the light source of an optical reader in such a manner that the longevity of the light source is increased and/or blinding of persons in the area of the equipment is prevented or at least reduced.

Still a further significant object of the present invention relates to an improved method of controlling a light source of an optical reader in a manner enhancing the duration of use of the light source, thereby keeping to a minimum the downtime of the equipment.

Another significant object of this invention relates to an improved apparatus for controlling the light source of an optical reader such that the light source is only then placed into full operation during the article read-out operation and is operated at reduced or no-power during the other time periods.

Now in order to implement these and still further objects of the invention, which will become more readily apparent as the description proceeds, the inventive method for controlling the light source of an optical reader is manifested by the features that a light source producing a scanning light beam is essentially only placed into its working phase, i.e., into its working condition or into its full operating condition during the time-span required for undertaking the scanning operation, and during the remaining time this light source is controlled so as to assume a preparatory condition with reduced or interrupted power supply.

Apart from the aforementioned method aspects the invention is also concerned with an improved apparatus for the performance thereof and which is manifested by the features that there is provided a light source generating a scanning light beam and a power supply mechanism associated with this light source. A control mechanism is operatively associated with the power supply mechanism for the adjustment respectively of the operating condition and preparatory condition of the light source. The control mechanism has delivered thereto an input signal as a function of the passage of the articles or the like through the read-out zone of the reader.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
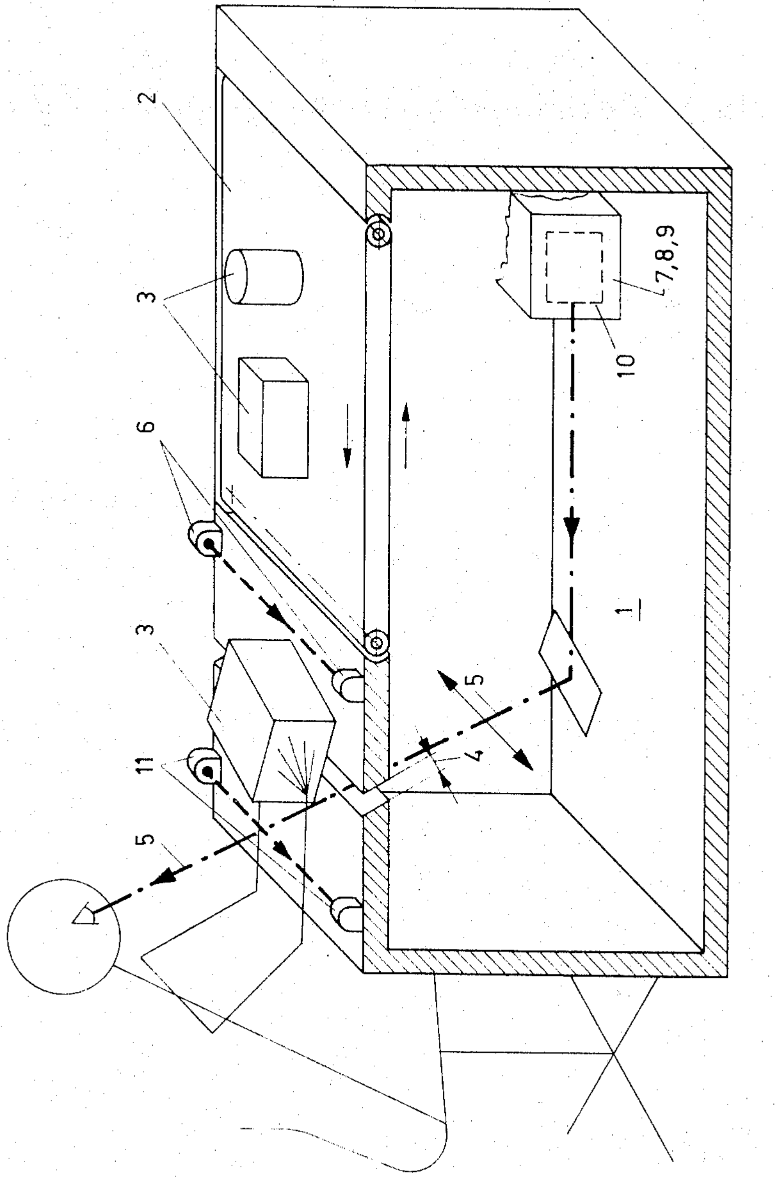
FIG. 1 is a schematic view showing a construction of processing station equipped with an optical reader and serving for the determination of random articles or objects.

Describing now the drawings, and according to the exemplary embodiment depicted therein it is assumed by way of explanation that the environment of use of the invention is a processing or check-out station for determining articles selected by a customer in a self-service store. The articles selected by any given customer are presented by the customer or an employee to apparatus of the type depicted in FIG. 1. Now in Figure reference character 1 designates in its entirety the processing or check-out station. Such processing station 1 will be seen to embody a conveyor or conveying mechanism 2, for instance a conveyor belt or band, which transports the articles 3 placed thereon in sequence, one after the other, at least approximately to the neighborhood of a readout or reading zone 4 through which such articles are then subsequently automatically or manually sequentially passed. At the reading zone 4 there operates in known manner a movable light beam 5 which produces a scanning trace upon a suitable character applied to the article 3. An exemplary construction of reader mechanism suitable for this purpose has been disclosed in the commonly assigned U.S. application, Ser. No. 221,702, filed Jan. 28, 1972, and entitled "Reading Apparatus For Optically Discernible Characters," to which reference may be readily made. The scanning trace passes through locations of different reflection capability. Light reflected from individual points of the scanning trace is transformed in known manner at the reader into electrical signals and such are subsequently evaluated for instance at a computer or the like, and if desired, indicated and/or delivered to a calculator.

Figure 2:
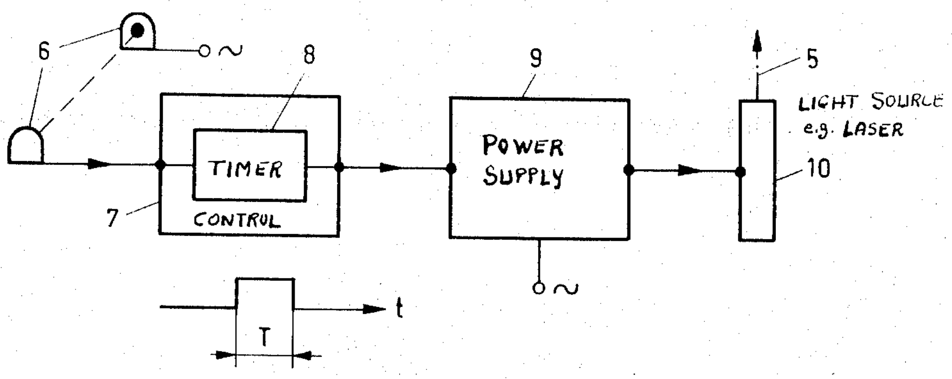
FIG. 2 is a simplified block diagram of apparatus for controlling the light source of an optical reader contained at the processing station.
Figure 3:
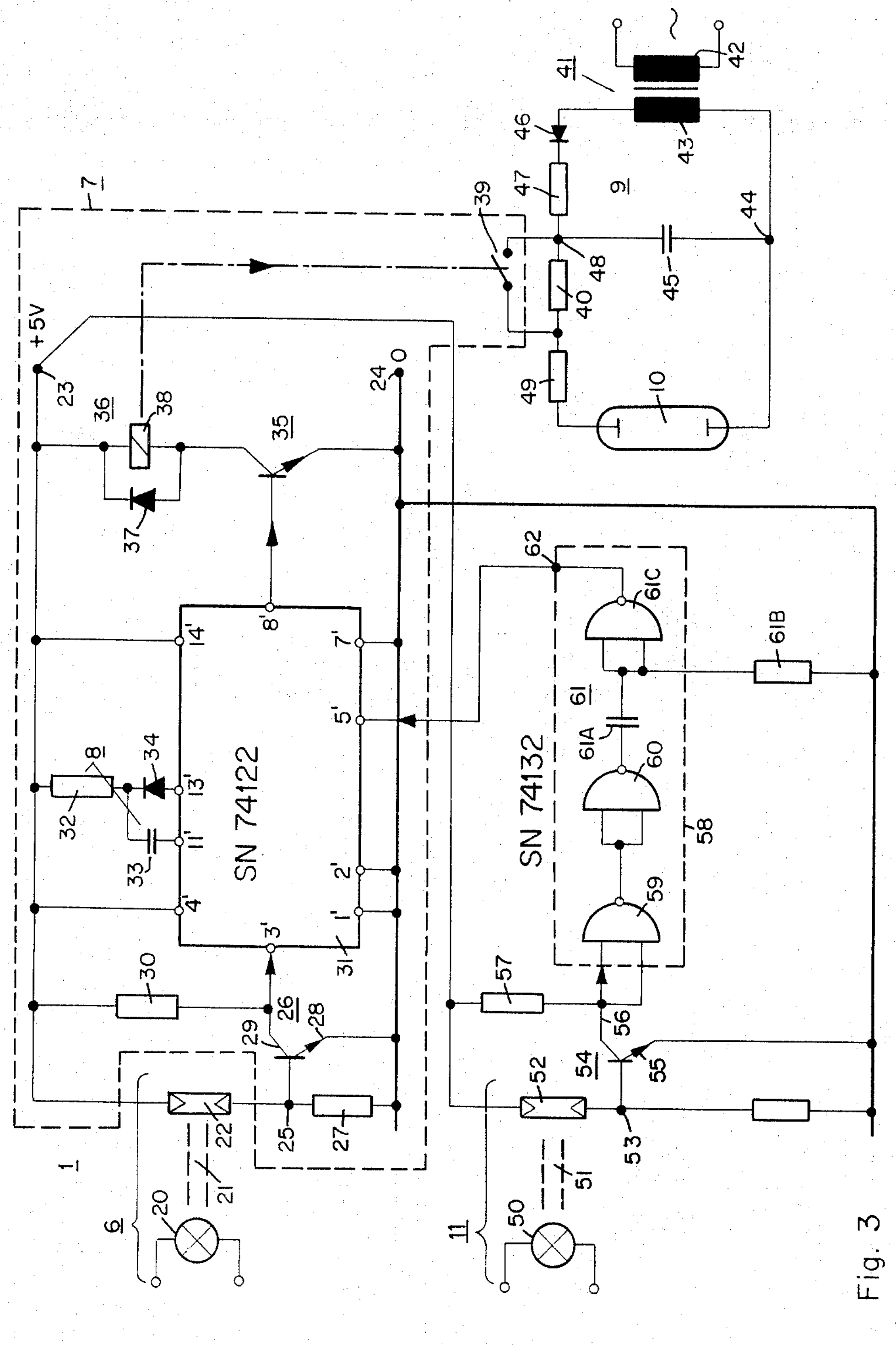
FIG. 3 is a detailed circuit diagram of the arrangement depicted in FIGS. 1 and 2.

During such time as the articles 3 approach or penetrate into the reading zone 4 such pass through barrier means 6, for instance a light barrier embodying a conventional light source 20 and photoelectric cell or photoresistor 22 by way of example, and as best seen by referring to FIG. 3. A thus produced control signal is delivered to a control mechanism 7, particularly illustrated in FIGS. 2 and 3. Control mechanism 7 can embody for instance a time-delay element 8, for instance a monostable multivibrator or monoflop. This time-delay element or timing element 8 is connected with a power supply device 9 associated with a light source 10. Light source 10 can be for instance a halogen lamp, a xenon lamp, a laser light source, for instance a He-Ne-gas laser or a solid body laser or the like. An output signal of the control mechanism 7 emanating from the timing element 8 is delivered to the power supply device 9 of the light source 10. Upon each passage of the article 3 through the scanning zone 4 this signal controls the light source 10 during a time-span T from a previously assumed preparatory state characterized by reduced or interrupted power supply into an operating state which is characterized by a full power supply for the light source 10. This will be explained more fully in conjunction with the circuitry of FIG. 3.

By means of the output signal of the control mechanism 7 delivery of the power supply energy to the light source 10 is controlled. To this end there can be employed at the control mechanism or device 7 any suitable means, such as a controlled silicon rectifier, a triac or the like or the means to be considered by way of example hereinafter with reference to FIG. 3.

Resetting of the light source back into its preparatory conditon, after having carried out an optical reading of the character or after having left the reading zone 4, can be undertaken for instance automatically after resetting of the timing element 8 following expiration of the time span T or can occur following the reading of a character at the article by means of an output signal of an evaluation mechanism obtained by the scanning of the character, or finally can occur upon passage through a further barrier 11 arranged subsequent to the reading zone 4, as also will be explained in greater detail when discussing FIG. 3.

Owing to the described measures the full power is only delivered to the light source 10 during the actual working or operating phase, whereas during the remaining time there is delivered reduced or even no-power to the light source. As a result, there is obtained increased operating duration or longevity of the reader mechanism since the available period of use of the light source is essentially only consumed during the operating phases. Consequently, there are ensured for greater disturbance free operational periods of the reader mechanism and reduced operational costs, both from the standpoint of lower wear at the light source as well as reduced consumption of power or energy supply.

A particularly advantageous further embodiment of the invention can be realized in the following way: The reader mechanism is placed into operation during the entire operational duration of the processing station, the light source 10 being operated at a preparatory condition with reduced power supply. The reduction in power supply is undertaken only to such an extent that the intensity of the light source is still just sufficient during the passage of an article through the scanning beam region to produce a clearly recognizable output signal at the reader mechanism. It is thus sufficient if this output signal of the reader mechanism indicates the presence of absence of an article 3 at the scanning beam region. However, it is not necessary that the intensity be sufficient for recognition of details of a character or marking identifying or characterizing the article or object 3.

This type signal generated upon entry of the article 3 into the region of the scanning light beam can then, similar to the previously mentioned output signal of the light barrier 6, be employed for up-controlling the light source 10. According to this embodiment the reader 1 itself is also employed as a light barrier for controlling the intensity of the light source 10. In this way there is realized a particularly smaller expenditure in components and switching means and an almost optimum limiting of the operating phase of the light source to the absolute minimum amount of time.

With a suitable configuration of the character identifying the article 3, for instance by providing a sufficiently wide or intense start marking and terminal marking thereat, it would be possible to even realize the effect that the complete intensity of the light source is only itself employed during the effective reading time of the character. This last mentioned embodiment of the invention is particularly then advantageous if there is employed a laser light source for generating the scanning beam 5. Laser light beams, if such possess sufficient intensity, as is known, can be damaging to the eyes of individuals impinged by such laser beams. However, according to the last-mentioned version of the invention the laser light source is only in operation at full power during the effective scanning of the article 3 or its character, during the remaining time, however, is operated with only reduced power. Since, however, at the time of full power of the scanning beam 5 the article 3 covers such beam towards the outside injury to the eyes of persons located at the region of the processing station 1 is eliminated. Reduction in the intensity of the light source can be, for instance, carried out by alternately switching the light source 10 to different taps of a secondary winding of a supply transformer. For this purpose there could be used switching relays or controlled silicon rectifiers actuated by the control mechanism 7. The control mechanism 7 can also have delivered thereto a control signal from an evaluation device which is obtained by scanning a starting code or a terminal code of a code character at the evaluation device.

Finally, FIG. 3 illustrates details of an exemplary embodiment of electrical circuit for an apparatus for controlling a light source of an optical reader mechanism as schematically depicted in FIG. 1.

Considering now the circuit diagram of FIG. 3 in detail, it will be seen that a first light barrier 6 possesses a lamp 20 which is supplied with energy, for instance, from the power network. This lamp 20 projects, through the agency of any suitable and therefore not particularly illustrated optical or auxiliary means, as for instance a lens, a bundle of light rays 21 upon a photoresistor 22. A terminal 23 has delivered thereto a positive voltage of, for instance, 5 volts. A further terminal 24 is at null potential. The photo-resistor 22 is connected on the one hand with the terminal 23 and on the other hand with the base 25 of a transistor 26. This transistor base 25 is coupled through the agency of a further resistor 27 with the terminal 24. The emitter 28 of the transistor 26 is likewise connected with the terminal 24, whereas its collector 29 is connected through the agency of a resistor 30 with an input 3' of a commercially available integrated circuit 31, for instance available from the well known concern Texas Instruments under its commercial designation Type SN 74122. The integrated circuit 31 contains a Schmitt-trigger which can be activated by a signal delivered by transistor 26.

Following the Schmitt-trigger of the integrated circuit 31 is a monostable, resettable multivibrator, the transit time T of which is determined by the timer or timing element 8 consisting of a resistor 32, capacitor 33 and diode 34. The aforementioned monostable multivibrator can be reset at any time by means of a resetting pulse which is delivered to an input 5' of the integrated circuit 31. Further data concerning the commercially available circuit 31 can be found in the corresponding data sheet for such circuit as issued by Texas Instruments.

Continuing, at an output terminal 8' of the circuit 31 there is connected the base of a switching transistor 35. A relay 36 is coupled with the collector circuit of the switching transistor 35. A diode 37 is connected to a coil 38 of the relay 36 for voltage limiting purposes in well known manner. Relay 36 possesses a switching contact 39 arranged parallel to a resistor 40 at the power supply device 9. This power supply device 9 serves to supply current to helium-neon laser 10. The switching contact 39 is designed as a work contact.

Supply device 9 possesses a network transformer 41, the primary winding 42 of which can be connected , for instance, at a power network of 220 volts and 50 Hz. One end of the secondary winding 43 of the network transformer 41 is coupled with a terminal or pole 44 of a storage capacitor 45 and with an electrode of the laser 10. The other end or terminal of the secondary winding 43 is connected through the agency of a high-voltage rectifier 46 and a resistor 47 with the other terminal or pole 48 of storage capacitor 45. Between both terminals 44 and 48 of the storage capacitor 45 there is present a voltage of several kilovolts serving as the supply voltage for the helium-neon gas laser 10.

Now at the supply current circuit for the helium-neon-gas laser 10 there is arranged both the resistor 40 as well as also a pre-resistor 49. The circuit is designed such that the switching contact 39 constructed as a work contact, when the bundle of light rays 21 is not interrupted, is open, and upon interruption of the bundle of light rays 21 this switching contact 39 is closed for at most the time-span T. The time-span T is determined by the time-constant of an RC-element formed by the resistor 32 and the capacitor 33. For instance, this time-span T can amount to 1.6 seconds.

Now as soon as the article 3 depicted in FIG. 1, has entered into the region of the bundle of light rays 21, as depicted in FIG. 3, the resistor 40 is shunted by the now closed switching contact 39 and the current delivered to the laser 10 is increased. As a result, there is obtained the requisite intensity of the light beam 5 for faultless read-out.

After the time-span T the switching contact 39 again opens and the laser 10 then again receives a reduced power supply.

The function of the second light barrier 11, as depicted in FIGS. 1 and 2, is such, that in the event of a very rapid sequence of passing article 3 the time-span T can be shortened. This light barrier 11 possesses a lamp 50 which for instance can be connected to the power supply network and which through the agency of any suitable and again non-illustrated optical means, such as a lens, directs a bundle of light 51 towards a photo-resistor 52. One terminal or pole of the photo-resistor 52 is connected with the terminal 23 and by means of its other terminal or pole is connected with the base 53 of a transistor 54, the emitter 55 of which is connected with the terminal 24 and the collector 56 of which is connected via a resistor 57 with the terminal 23. A signal at the ocllector 56 of the transistor 54, and which signal is produced as a result of the passage of an article 3 through the light barrier 11, is delivered to integrated circuit 58, for instance also commercially available from Texas Instruments under its trade designation Type SN 74132. This signal is delivered through the agency of a Schmitt-trigger 59 to an inverter 60. A standard differentiator 61 consisting for example of the capacitor 61A, the resistor 61B and a NAND-gate 61C is arranged following the inverter 60. The circuit is designed such that upon penetration of an article 3 into the light barrier 11 there is produced a resetting pulse for the monostable resettable multi-vibrator at integrated circuit 31 at output 62 of the integrated circuit 58. This resetting pulse is delivered to resetting input 5' of the circuit 31. If an article 30 passes through the second light barrier 11 prior to termination of the complete time-span T, in other words for instance prior to expiration of 1.6 seconds after the first light barrier 6 has been passed by such article, then, the timer or timing element 8 will be reset without delay, that is the effective time span T will be appropriately shortened.

While there is shown and described present preferred embodiments of the invention, it is to be distinctly understood that the invention is not limited thereto but may be otherwise variously embodied and practiced within the scope of the following claims. ACCORDINGLY,

What is claimed is:

1. A method of controlling a light source of an optical reader for the recognition of articles or the like, comprising the steps of controlling a light source generating a scanning light beam such that it operates at full power during its working condition and essentially only during the time-span required for an article scanning operation, controlling such light source during the remaining time so as to assume a preparatory condition with reduced or interrupted power, and wherein an output signal of a control mechanism is employed to act upon a power supply device for the light source of the reader such that the light source is supplied by the power supply device, during the time such light source assumes its preparatory condition, only with a reduced power supply which is of sufficient magnitude that when an article passes through a reading zone of the reader there is generated an output signal by means of which there can be indicated the entry of an article, delivering this output signal to the control mechanism by means of which there is produced a further output signal, and employing the further output signal to cause the power supply device to deliver for a predetermine period of time the full power supply to the light source of the reader and thus to place such light source tempo-rarily into its working condition.

2. The method as defined in claim 1, including the steps of employing the articles to be recognized by the reader so as to trigger a control signal at a barrier means no later than during passage of an article through a reading zone of the reader, delivering such control signal to the control mechanism, employing such delivered control signal to place a timing element of the control mechanism into operation, generating an output signal during the operating time of the timing element, delivering such output signal to the power supply device for the light source of the reader, and employing such delivered output signal to operate said supply device such that the supply device before and after said operating time of the timing element places the light source in its preparatory condition with reduced or interrupted power supply, but during the operating time of the timing element the light source is placed into its working condition and thus the full power supply is delivered to the light source.

3. The method as defined in claim 1, further including the step of triggering a control signal at a barrier means by each article to be recognized by the reader prior to entry of the article into the reading zone of the reader, delivering such control signal to the control mechanism, producing an output signal at the control mechanism, delivering the output signal to the power supply device for the light source of the reader, employing the delivered output signal to control the power supply device in such a manner that the light source is shifted from a prior assumed preparatory condition with reduced or interrupted power supply for the light source into its working condition in which the power supply device delivers the full power supply to the light source, moving the articles after departing from the reading zone through a further barrier means and generating a further control signal at said further barrier means, delivering said further control signal to the control mechanism, producing a further output signal at said control mechanism by means of which the light source is again reset back into the preparatory condition.

4. The method as defined in claim 1, including the step of utilizing disappearance of the output signal of the reader for a predetermined period of time for operating the control mechanism to again control the power supply device so as to deliver a reduced power supply to the light source and thus again resetting the light source back into its preparatory condition.

5. The method as defined in claim 1, including the step of passing on article bearing a coded marking characterizing such article through a reading zone of the reader, generating an output signal of a control mechanism for the light source upon impingement of the scanning light beam upon the coded character of the article, and employing the generated output signal to place the light source into its working condition.

6. The method as defined in claim 5, further including the step of controlling the light source to assume its preparatory condition when the scanning light beam again no longer impinges upon the coded marking of the article.

7. An apparatus for controlling a light source of an optical reader having a reading zone, comprising a light source generating a scanning light beam, power supply means for said light source, control means provided for said power supply means for regulating the light source so as to respectively assume a working condition and a preparatory condition, the power supply energy to said light source during its working condition being greater than during its preparatory condition, said control means having delivered thereto an input signal as a function of the passage of an article through the reading zone of the reader, and wherein said reader has an output and said control means an input, said output being connected with said input of the control means in such a manner that an output signal of the reader produced by scanning a code character characterizing an article acts through the agency of said control means upon said power supply device and thus places the light source into its working condition where it is furnished with the full power supply energy essentially only during the time when the scanning light beam sweepingly passes over the code character.

8. The apparatus as defined in claim 7, further including a first barrier means arranged forwardly of the reading zone of the reader with respect to the movement of the articles, an output signal of said first barrier means defining said input signal serving to supply the full power supply energy to the light source of the reader so as to cause said light source to assume its working condition.

9. The apparatus as defined in claim 7, further including barrier means operatively associated with the control means such that upon passage of an article through said barrier means there is triggered a control signal delivered to control means as said input signal.

10. The apparatus as defined in claim 9, further including a second barrier means arranged following the reading zone of the reader with respect to the movement of the articles, an output signal of such second barrier means serving to regulate the preparatory condition of the light source of the reader so that said light source operates with at least reduced power supply voltage.

* * * * *